US010057935B2

(12) United States Patent
Sartori et al.

(10) Patent No.: US 10,057,935 B2
(45) Date of Patent: *Aug. 21, 2018

(54) SYSTEM AND METHOD FOR D2D RESOURCE ALLOCATION

(71) Applicant: Futurewei Technologies, Inc., Plano, TX (US)

(72) Inventors: Philippe Sartori, Plainfield, IL (US); Brian Classon, Palatine, IL (US); Vipul Desai, Palatine, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,660

(22) Filed: Sep. 25, 2017

(65) Prior Publication Data

US 2018/0014345 A1    Jan. 11, 2018

Related U.S. Application Data

(63) Continuation of application No. 14/842,523, filed on Sep. 1, 2015, now Pat. No. 9,794,976.

(60) Provisional application No. 62/045,465, filed on Sep. 3, 2014.

(51) Int. Cl.
| | | |
|---|---|---|
| H04W 76/14 | (2018.01) | |
| H04W 72/04 | (2009.01) | |
| H04W 76/02 | (2009.01) | |
| H04W 92/18 | (2009.01) | |
| H04W 88/04 | (2009.01) | |

(52) U.S. Cl.
CPC ....... *H04W 76/14* (2018.02); *H04W 72/0406* (2013.01); *H04W 76/023* (2013.01); *H04W 88/04* (2013.01); *H04W 92/18* (2013.01)

(58) Field of Classification Search
None
See application file for complete search history.

(56) References Cited

U.S. PATENT DOCUMENTS

| | | |
|---|---|---|
| 8,130,776 B1 | 3/2012 | Sundararajan |
| 2012/0129540 A1 | 5/2012 | Hakola et al. |
| 2013/0155962 A1 | 6/2013 | Hakola et al. |
| 2013/0223352 A1 | 8/2013 | Sartori et al. |

(Continued)

FOREIGN PATENT DOCUMENTS

| | | |
|---|---|---|
| CN | 103002594 A | 3/2013 |
| CN | 103517276 A | 1/2014 |

(Continued)

*Primary Examiner* — Christine Duong
(74) *Attorney, Agent, or Firm* — Futurewei Technologies, Inc.

(57) ABSTRACT

When at least one of device-to-device UEs in connections of a group of D2D UEs is outside of the coverage area of mobile network of an access point, an information exchange mechanism established directly between the D2D UEs without involving a third party, is provided. A Sidelink Control Information (SCI) message type comprises one or more format flags indicating the respective resource allocation format, obtaining a first SCI message, adjusting a size of the first SCI message based on the determined size, and transmitting the adjusted first SCI message by a first UE in a Physical Sidelink Control Channel (PSCCH) to one or more second UEs for establishing the D2D communication link.

17 Claims, 9 Drawing Sheets

(56) References Cited

U.S. PATENT DOCUMENTS

| | | | |
|---|---|---|---|
| 2013/0322413 A1 | 12/2013 | Pelletier et al. | |
| 2014/0198747 A1* | 7/2014 | Ouchi | H04L 5/0053 370/329 |
| 2015/0049694 A1 | 2/2015 | Choi et al. | |
| 2015/0341974 A1 | 11/2015 | Wu et al. | |
| 2016/0255647 A1* | 9/2016 | Zhu | H04W 72/1278 370/329 |
| 2017/0295601 A1* | 10/2017 | Kim | H04W 76/023 |

FOREIGN PATENT DOCUMENTS

| | | |
|---|---|---|
| CN | 103906266 A | 7/2014 |
| EP | 2824848 A1 | 1/2015 |
| WO | 2010/082084 A1 | 7/2010 |
| WO | 2013/133576 A1 | 9/2013 |

\* cited by examiner

PRIOR ART

FIG. 1

PRIOR ART

SYSTEM AND METHOD FOR D2D RESOURCE ALLOCATION

This application is a continuation claims the benefit of U.S. application Ser. No. 14/842,523, filed on Sep. 1, 2015, entitled "System and Method for D2D Resource Allocation", which claims the benefit of U.S. Provisional Application No. 62/045,465, filed on Sep. 3, 2014, entitled "Control information for D2D" which applications are hereby incorporated herein by reference.

TECHNICAL FIELD

The present invention relates to a system and method for mobile communication network, and, in particular embodiments, to a system and method for device-to-device (D2D) direct connections.

BACKGROUND

In the field of mobile networks, especially in the radio access networks, there has been increasing demand for heterogeneous networks, where different types of access points and mobile devices communicate with each other. In addition, direct device-to-device (D2D) communication may be used to further boost the network capacity. D2D communication refers to a communication mode between two or more user equipments (UEs) that does not include, or does not always include, an access point (AP) in a communication path between or among the UEs. D2D communication is also called proximity service (ProSe) communication. Proximity service identifies a UE that is in proximity of another UE.

In a communication network where different types of communication links share a communication resource, they may undesirably interfere with each other. For example, when D2D UEs and one or more non-D2D UEs share an uplink band during communications with a Base Transceiver Station (BTS), the D2D UEs and the cellular UE may interfere with each other.

SUMMARY

A method for communicating a resource allocation for a device-to-device (D2D) communication link between two or more D2D user equipments (UEs) in a mobile communication network is provided according to an example. The method includes a first D2D UE indicating resource allocation information for the D2D communication link in a resource allocation message, identifying one or more Sidelink Control Information (SCI) message types each having a respective resource allocation format, wherein each message type comprises one or more format flags indicating the respective resource allocation format for each of the SCI message types; determining a size of a message of at least one of the SCI message types; obtaining a first SCI message having a first type having a first respective resource allocation format; adjusting a size of the first SCI message based on the determined size of the message of the at least one of the SCI message types so that the size of the message is coupled to the first type having the first respective resource allocation format; and transmitting the adjusted first SCI message by a first UE in a Physical Sidelink Control Channel (PSCCH) to one or more second UEs for establishing the D2D communication link.

A device-to-device (D2D) UE is provided according to another example. The D2D UE includes a memory storing instructions; and a processor coupled to the memory, wherein when the instructions are executed by the processor, the D2D UE is configured to identify one or more Sidelink Control Information (SCI) message types each having a respective resource allocation format, wherein each message type comprises one or more format flags indicating the respective resource allocation format for each of the SCI message types; determine a size of a message of at least one of the SCI message types; obtain a first SCI message having a first type having a first respective resource allocation format; adjust a size of the first SCI message based on the determined size of the message of the at least one of the SCI message types so that the size of the message is coupled to the first type having the first respective resource allocation format; and transmit the adjusted first SCI message by a first UE in a Physical Sidelink Control Channel (PSCCH) to one or more second UEs for establishing the D2D communication link.

BRIEF DESCRIPTION OF THE DRAWINGS

For a more complete understanding of the present invention, and the advantages thereof, reference is now made to the following descriptions taken in conjunction with the accompanying drawings.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The terms used in this application, like "UE" or "device" or "terminal" as D2D devices can also comprise a subscriber, subscriber unit, a subscriber station, a mobile device such as a phone or tablet, a remote station, a mobile station, a system, a remote terminal, an access terminal, a user terminal, a user entity or user equipment (UE), a communication device, a user agent, a user device, a laptop computer, an e-book reader or other devices. The term "UE" in the application also represents a computer-related entity, such as but not limited to hardware, firmware, a combination of hardware and software, or software in execution. The disclosed embodiments also apply to machine-to-machine (M2M) communications. The devices disclosed herein can also mean such kind of machines, like cars, buses, printers, copiers, refrigerators etc.

An access point (AP) can be, for example, a network controller, an evolved NodeB (eNB), a NodeB, a base station, a controller, a relay, a relay node and the like. According to the transmission power and backhaul capability, the access point may also be known as a macro cell, low power node (LPN), relay node, pico cell, and so on.

A D2D communication link is a direct communication between two devices. The direct communication link can be called a D2D link, a proximity service (ProSe) link, a sidelink, or other applicable term. The D2D link will facilitate interoperability between critical public safety networks and ubiquitous commercial networks because of an ability to offer new services, improve system throughput, and offer a better user experience.

In D2D technology, there are two main operational phases: one is discovery, and the other is communication. Regarding the discovery phase of a D2D device, for example, a UE can attempt to discover neighboring UEs. However, the discovery operation can be carried out by either the UE or the associated AP. Regarding the communication phase among D2D devices, for example, a UE directly communicates with another UE without the data transiting through the AP.

Figure 1:
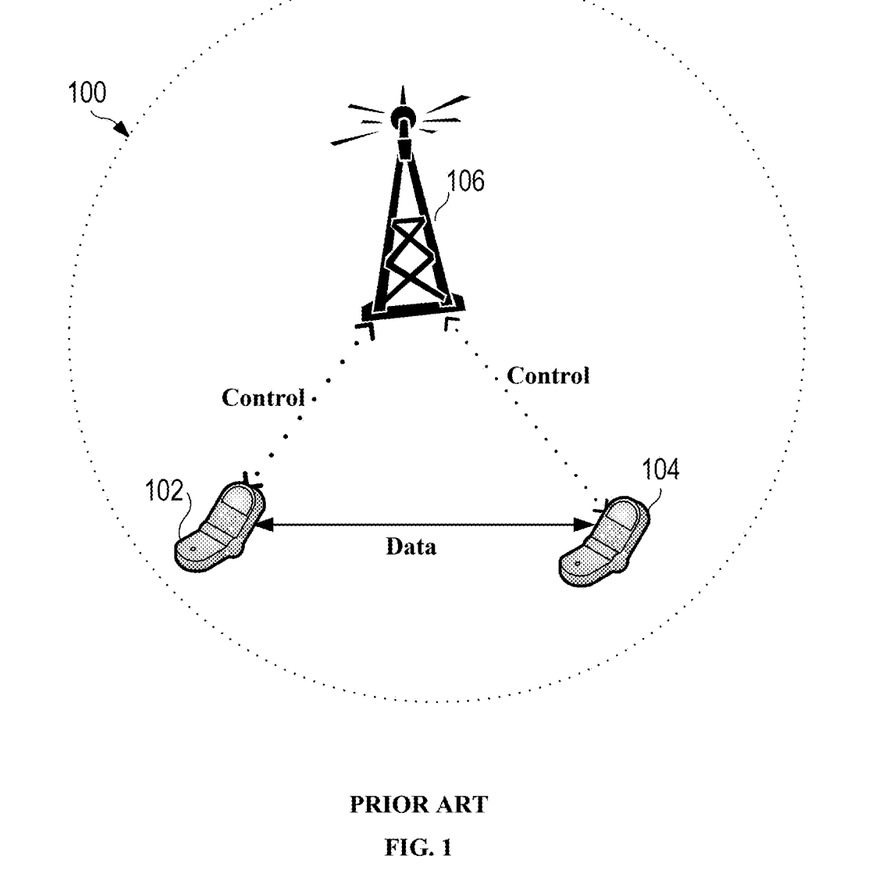
FIG. 1 shows a prior art D2D communication in a mobile communication network.

FIG. 1 shows a prior art D2D communication in a mobile communication network 100. The mobile communication network 100 includes an Access Point (AP) 106, where the AP 106 generates a coverage area (dashed line). One or more user equipments (UEs) 102 and 104 can communicate with the AP 106 and the mobile communication network 100. A first UE 102 can transmit communication messages to a second UE 104 through the AP 106. Alternatively, the first UE 102 can communicate with the second UE 104 in a device-to-device (D2D) communications. In D2D, data communications are directly exchanged between participating D2D UEs. Control communications may be directly exchanged or may be relayed through the AP 106.

An access point (AP) 106 schedules the resources used by a first D2D UE 102 to exchange data and control information with another D2D UE 104. The AP 106 controls transmission power of a scheduling assignment (SA) and data communications for the UE 102, 104, using the physical downlink control channel (PDCCH) or enhanced PDCCH (EPDCCH). Both the D2D UE 102 and the D2D UE 104 are within range of the AP 106 in this example. The transmitting D2D UE 102, 104 transmits the resource allocation information to the receiving D2D UE 102, 104.

Figure 2:
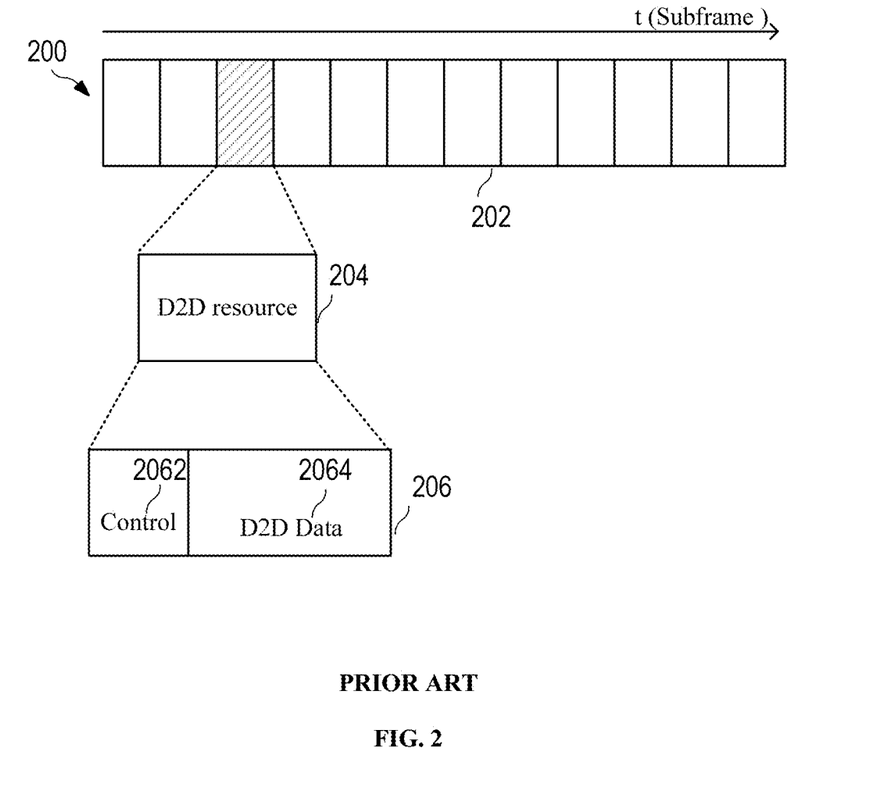
FIG. 2 shows a prior art D2D communication link resource allocation.

FIG. 2 shows a prior art D2D link resource allocation. A resource block 204 is allocated from a sub-frame 202 of a frame 200 for a D2D connection. The D2D connection uses the allocated D2D resource 204 for both control information 2062 and data transmission 2064 in a same channel 206.

But when at least one of the D2D UEs is outside of the coverage area of the AP 106, the mobile communication network 100 cannot be used for exchanging resource allocation information. An information exchange mechanism established directly between the D2D UEs, without involving a third party, is thus needed.

In the embodiments, one transmitting D2D UE linking to and communicating with one receiving D2D UE is given as an example. However, more than two D2D UEs can be involved in D2D communications, including one to one (D2D), device-to-multi-device (D2MD), or multi-device to multi-device (MD2MD). The D2D communication link shown below also applies to connections between multiple D2D UEs.

Figure 3:
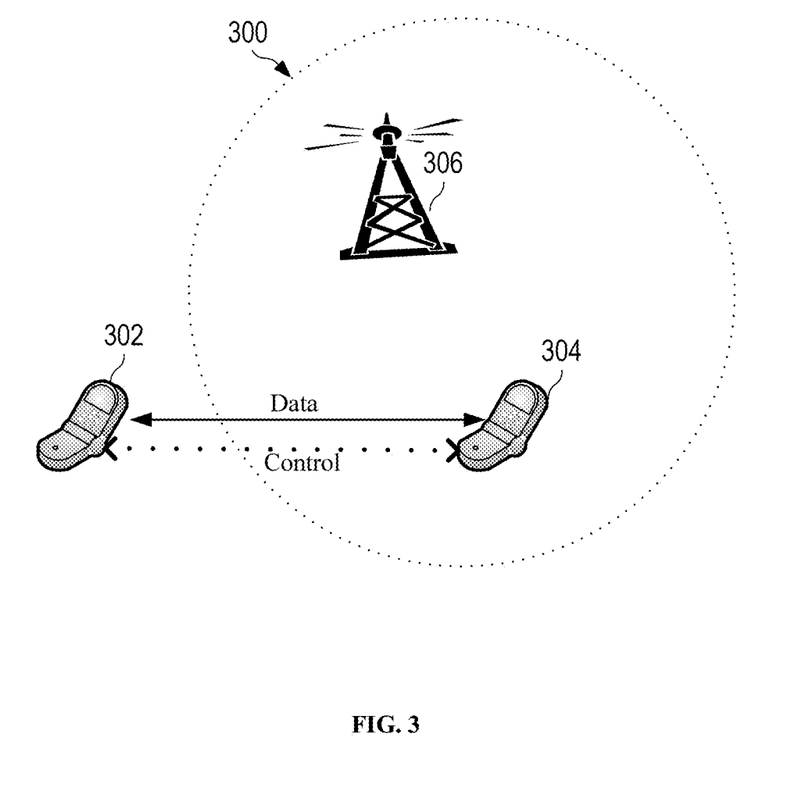
FIG. 3 shows an example of D2D communication in partial mobile network coverage.

FIG. 3 shows an example of D2D communication in partial mobile network coverage. When at least one D2D UE is outside of the coverage area 300 of the AP 306, a D2D UE 302, 304 on its own selects resources from resource pools to transmit direct data and control information. A D2D UE 302, 304 can also use a resource that has been allocated by an access point for D2D connections. The AP 306 generally does not participate in the resulting D2D communication message transmissions. Both a receiving D2D UE and a transmitting D2D UE normally need to know the allocated resources in order to establish connections between them.

In an embodiment, a resource allocation method for establishing a device-to-device (D2D) communications link between two or more D2D user equipments (UEs) in a mobile communication network includes a first D2D UE indicating resource allocation information for the D2D communication link in a resource allocation message, wherein the resource allocation message is mapped into a resource allocation format; wherein the resource allocation format comprises one or more format flags; wherein one or more resource allocation messages are differentiated in the resource allocation format in accordance to the one or more format flags; and the first D2D UE transmitting the resource allocation format in a Physical Sidelink Control Channel (PSCCH) to one or more additional D2D UEs.

The resource allocation format may include only one format flag, and the only one format flag is mapped to all resource allocation messages needed for the communicating the resource allocation for the D2D communication link.

The method may further include a dedicated control channel established between the first D2D UE and the one or more additional D2D UEs according to the resource allocation information, wherein the dedicated control channel is used for communicating only control information between the first D2D UE and the one or more additional D2D UEs.

The resource allocation message may include one or more Sidelink Control Information (SCI) messages, and the one or more SCI messages are encoded according to the resource allocation format. Here encoding means the one or more SCI messages are communicated in the resource allocation format.

Typically, a message is conveyed using a format selected from a set of formats. Generally a format is a container for a Sidelink Control Information (SCI) message. One or more formats may have a common size. Size of a format may comprise a number of information elements of the format, or bits of the format, or resource blocks of the format. A format may also comprise a format flag. A format flag is used to indicate which type of SCI message is conveyed in a format. The format flag can be used to distinguished the SCI message because one or more SCI messages can use a common format. In some examples, size of the format flag is at least as large as the ceiling of the logarithm base 2 of the number of SCI messages supported by the format. If the size of the one or more messages is less than a predetermined format length, then at least one dummy bit is appended to the one or more message until the one or more message length equals the predetermined format length.

The predetermined format length can be a size of the longest resource allocation message among the one or more resource allocation messages. Then at least one dummy bit is appended to the other one or more resource allocation messages until the size of the other one or more resource allocation messages equals that of the longest resource allocation message. In other words, at least one dummy bit can be appended to the existing one or more resource allocation messages until the size of the one or more resource allocation messages equal a predetermined size of a format. By doing so, the size of the one or more resource allocation messages for each UE can be kept the same. Optionally, the dummy bit can be zero. In another alternative, the appending bit(s) is unspecified and ignored or not used by the D2D UE.

Optionally, all resource information needed for connections for the D2D link can be assigned to only one format. The one format contains all resource information that is needed for connections of D2D link. All resource information can be indicated in information bits of the one format. Individual information bits of the one format can be mapped to different resource allocation information. The one format is carried in the communication message to destination UEs.

For D2D communications, the number of PRBs used is unknown to the receiving D2D UE. As a result, it is difficult to multiplex control information with data information. The control information is transmitted separately from the data information by the transmitting D2D UE. The encoded bits of data information are interleaved and mapped to a transport channel, for example, the Physical Sidelink Shared Channel, PSSCH. The encoded bits of control information are interleaved and mapped to other transport channel, for example, the Physical Sidelink Control Channel, PSCCH.

More examples of possible solutions are illustrated below. These examples can be either combined with the method or by themselves independently to provide solutions for D2D connections.

Figure 4:
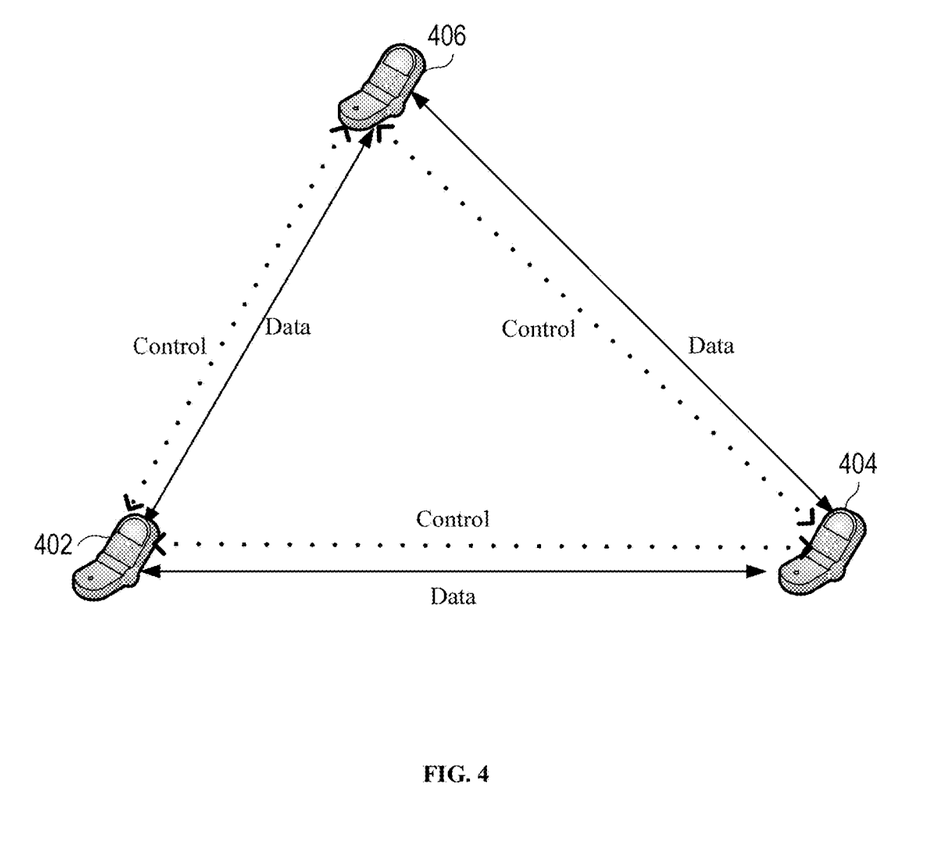
FIG. 4 shows an example of D2D communication where all UEs are outside of network coverage.

FIG. 4 shows an example of D2D communication where all UEs are outside of network coverage. For an example, each pair of D2D UEs has a dedicated control channel. A first D2D UE 402 can establish more than one D2D communication link with the other D2D UEs 404, 406. The number of D2D communication links that can be established at the same time depends on how many resource blocks have been preconfigured for D2D communications.

The control channel, for example, employs a Physical Sidelink Control Channel (PSCCH) in some embodiments. The resources allocated for the D2D communication link are typically allocated on the uplink portion of a frame, in an uplink band of the mobile communication network.

The control channel can be provided in many ways. For example at least one resource block of a subframe is allocated for a PSCCH. The subframe is one of the sub-frames of an uplink frame.

Figure 5:
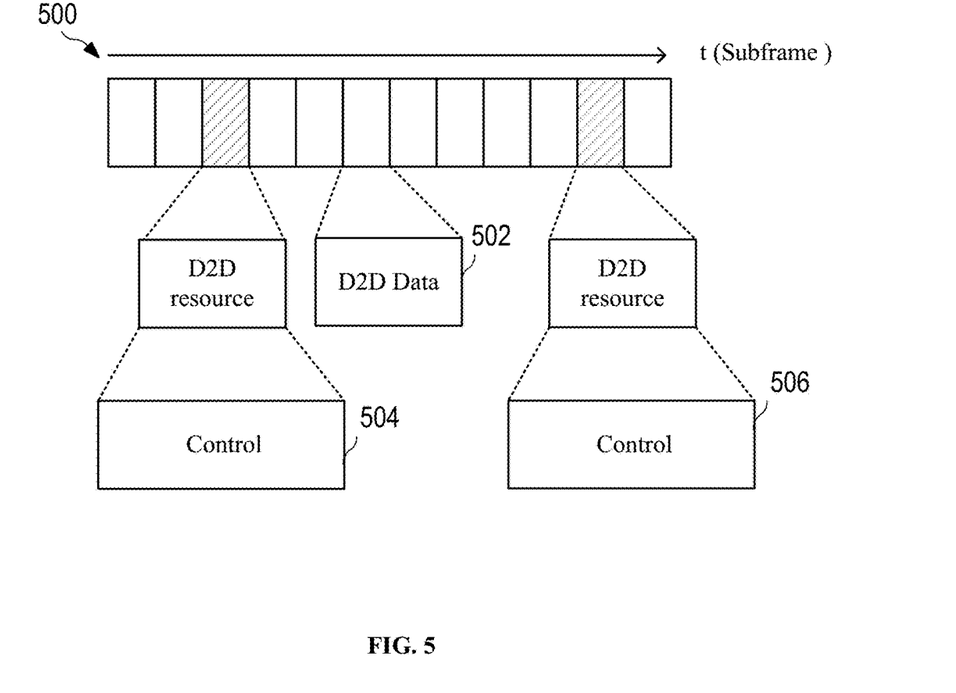
FIG. 5 shows an example of D2D link resource allocation.

FIG. 5 shows an example of D2D communication link resource allocation. A number of symbols is defined for a frame 500 which has a number of sub-frames. The sub-frame has a number of channels which carry data information or control information. Channels are mapped to resource blocks and a subframe includes a number of resource blocks. A D2D allocation resource for a control channel is separate from the D2D allocation resource for data transmission channel.

In an example, all resource blocks of a selected sub-frame in the frame 500 can formulate a scheduling assignment (SA) pool, for example sub-frame 504, sub-frame 506. A resource block can be selected autonomously from the SA pool. In that way, a SCI format can be transmitted by the source UE in an autonomous manner, which means the transmission does not need to be triggered by the AP. Alternatively, a separate or dedicated pool for transmitting SCI format may be set up, for example, a subset of the existing SA pool.

A resource block can also be allocated by the source D2D UE by indicating a frequency and sub-frame to be used. By doing so, the SCI format can be sent either in the SA pool or a separate pool.

The resource block can also be derived from the data frequency resource allocation. For example, the first sub-frame in the SA pool can be a sub-frame index. The lowest physical resource blocks (PRB) index of the received data frequency can be reserved for D2D communication link resource allocation.

The resource allocation information is indicated in a resource allocation message. The message can be a Sidelink Control Information (SCI) message. The Sidelink Control Information (SCI) messages are used on the PSCCH to carry resource allocation information. A sidelink is used for ProSe direct communication and ProSe direct discovery between UEs.

In order to define content carried by the SCI format, or to define different type of messages carried by the SCI format, SCI messages can carry further information that is used by connections. For example at least one format flag matching certain information of a resource allocation is carried in the message. There can be a matching table for the format flag matching which kind of certain resource allocation information. Thus, which information the format flag represents or which information is carried in the SCI message would be parsed out. The SCI format may comprise a field for the format flag.

The certain information that is carried by SCI messages includes at least one of the following: scheduling of PSCCH for broadcast, scheduling of PSCCH for broadcast and/or unicast, unicast or multicast scheduling of PSSCH, or transmitting of feedback information. The feedback information may also include information such as a Hybrid Automatic Retransmission reQuest (HARQ) acknowledgement (ACK) or negative acknowledgement, which can be described in short form as acknowledgement and negative acknowledgement (ACK/NAK), or Channel control quality information (CQI), etc. For example, SCI messages can carry the above-mentioned types of information by matching different formats or types of messages with at least one format flag.

Figure 6:
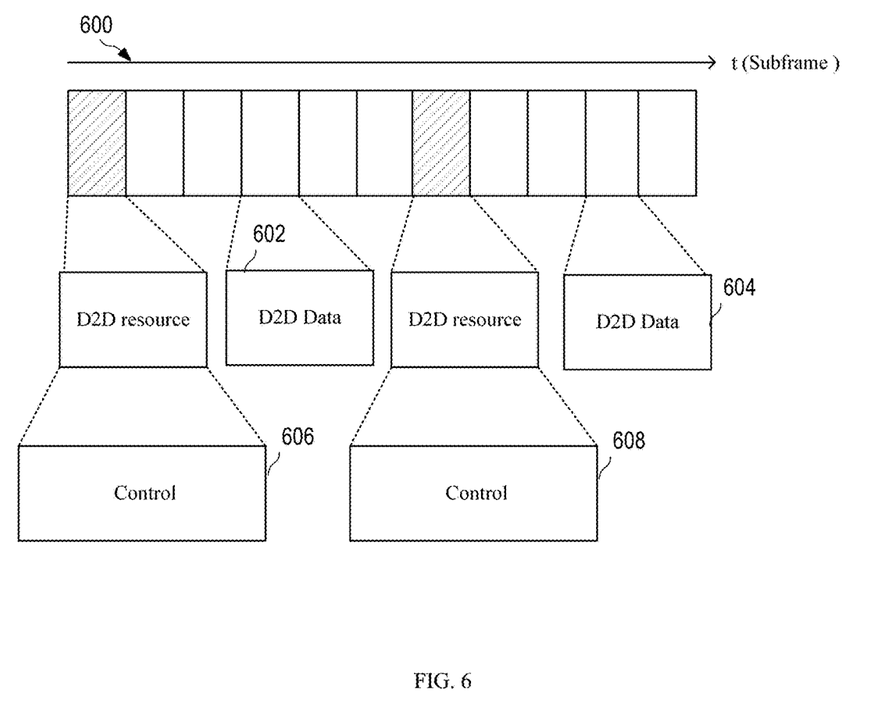
FIG. 6 shows another example of D2D link resource allocation.

FIG. 6 shows another example of D2D communication link resource allocation. A subframe 600 represents a scheduling assignment (SA) pool which has a number of resource blocks. A D2D allocation resource for control channel 606, 608 is separate from the resource for data transmission 602, 604. One or more resource blocks can be reserved or assigned as a control channel 606, 608 to the same or different D2D UEs. One or more resource blocks are assigned as a data channel 602, 604 to the same or different D2D UEs.

Figure 7:
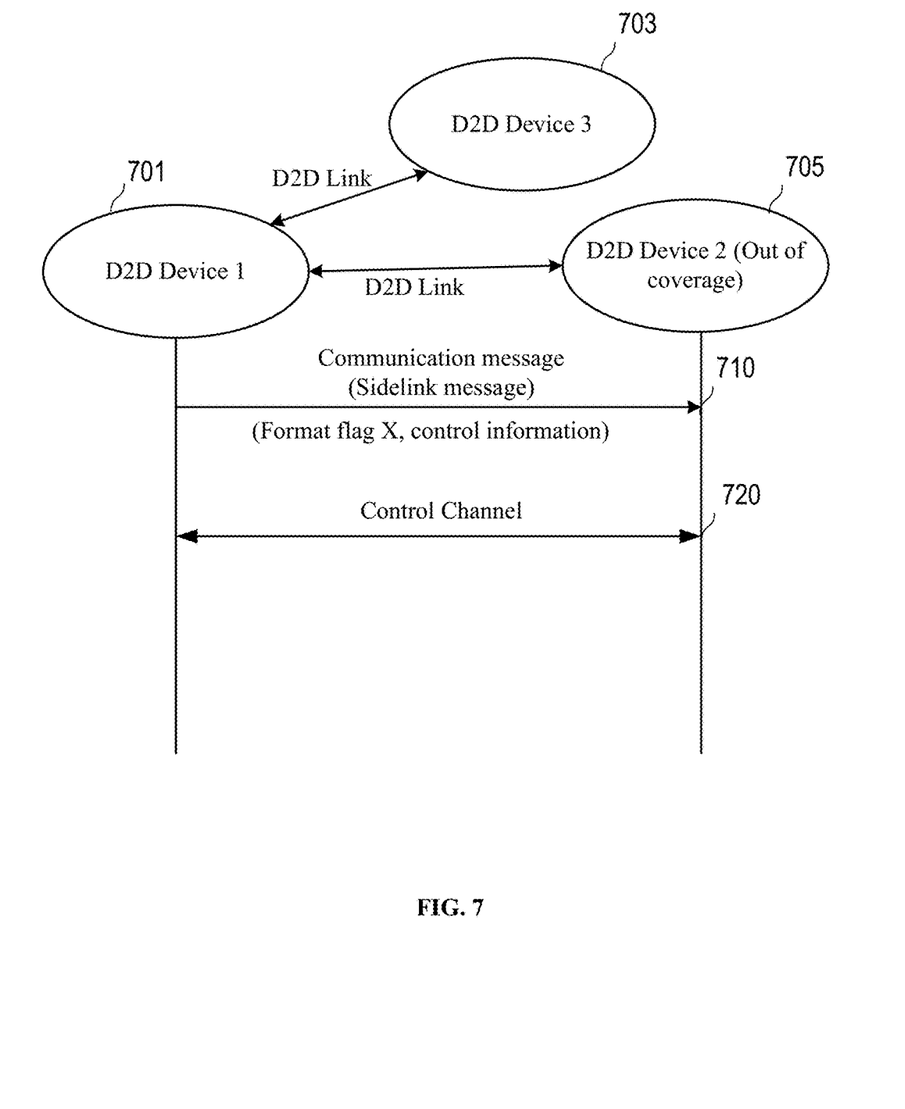
FIG. 7 shows an example of message flow in a D2D link connection establishment.

FIG. 7 shows an example of message flow in a D2D communication link connection establishment. The example is employed to establish connections between D2D UEs 701, 703, 705 when at least a second D2D UE 705 to be connected is out of the range of an access point (AP). In step 710, a first D2D UE 701 transmits a communication message including resource allocation information through a dedicated control channel to the at least second D2D UEs 703, 705. The message is a SCI message in some embodiments. The communication message carries one or more formats. The one or more formats are mapped to certain control information of the resource allocation information. The first D2D UE 701 transmits information on the control channel to the at least one of the other D2D UEs 703, 705 according to the resource allocation information. In step 720, the at least second D2D UEs 703, 705 transmit information to the first D2D UE 701 on the dedicated control channel of each pair of D2D UEs 701, 703, 705 according to the resource allocation information.

The control information of resource allocation includes at least one of the following: scheduling of the control channel for broadcast, scheduling of the control channel for unicast, scheduling of the control channel for both broadcast and unicast, or transmitting of feedback information.

The one or more formats can be used to convey SCI messages. An example of defined SCI formats is listed in Table 1. Not all of the formats need to be defined and present at the same time, in order to reduce the number of new formats to be defined or transmitted.

TABLE 1

Example of defined SCI formats

| Format | Description |
|---|---|
| 0 | Used for the scheduling of Physical Sidelink Shared Channel (PSCCH) for broadcast |
| 0-ext | Used for the scheduling of release-12 PSCCH for broadcast and unicast (SCI format-0 appended) |
| 1 | Used for feedback and may include info such as HARQ acknowledgement/negative acknowledgement (ACK/NAK), CQI, etc. |
| 2 | Used for unicast or multicast scheduling of release-x (x > 12) PSSCH, for future definition |

Figure 8:
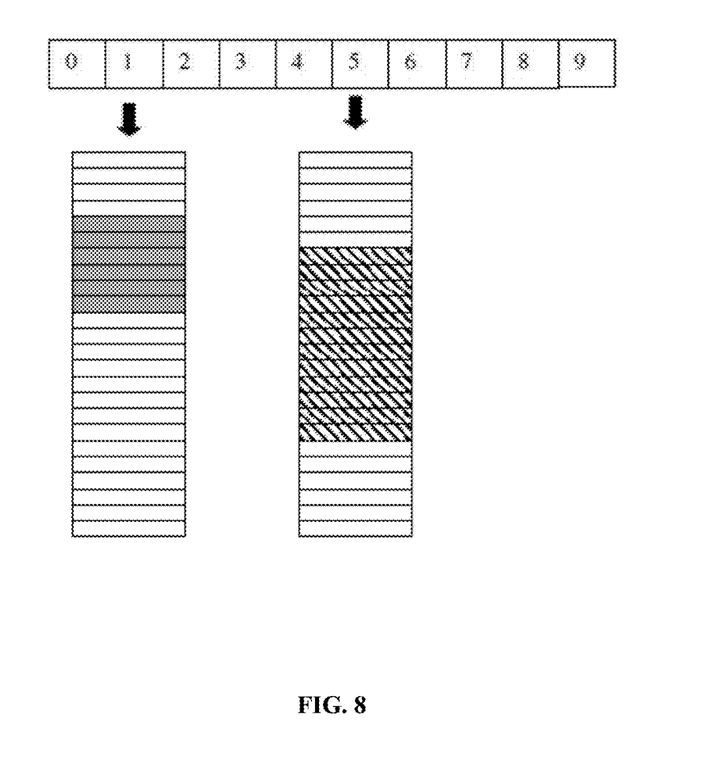
FIG. 8 shows resource pools for a D2D communication link.

FIG. 8 shows resource pools for a D2D communication link. FIG. 8 shows an example uplink frame with ten subframes labeled 0 to 9. Subframe 1 has a pool of resource blocks allocated for the PSCCH on the sidelink. Subframe 5 has a pool of resource blocks allocated for the PSSCH on the sidelink.

For example, SCI format 0 is configured for the scheduling of PSSCH. The procedure can comprise the following. SCI format 0 is used to transmit the information below, such as how many bits of the message are used for carrying the respective information (shown as an example in the brackets).

Frequency hopping flag (1 bit).
Resource block assignment and hopping resource allocation—$\lceil \log_2(N_{RB}^{SL}(N_{RB}^{SL}+1)/2) \rceil$ bits.
  For PSSCH hopping:
    $N_{SL\_hop}$ MSB bits are used to obtain the value of $\tilde{n}_{PRB}(i)$
    $(\lceil \log_2(N_{RB}^{SL}(N_{SB}^{SL}+1)/2) \rceil - N_{SL\_hop})$ bits provide the resource allocation of the first slot in the subframe.
  For non-hopping PSSCH:
    $(\lceil \log_2(N_{RB}^{SL}(N_{SB}^{SL}+1)/2) \rceil)$ bits provide the resource allocation in the subframe.
The Time-Resource Pattern Transmission (T-RPT) is the indication of the subframes for the D2D resource allocation, T-RPT index (7 bits).
Modulation and coding scheme and redundancy version (5 bits)
Timing advance indication (5 bits)
Note that $N_{RB}^{SL}$ is the sidelink bandwidth configuration expressed in the number of resource blocks (RBs).

For example, two or more SCI formats are carried in a SCI message. The SCI message can use a format flag or a flag field to identify such format. For example, SCI format 0-ext can carry such a format flag. The fields of the SCI formats may be different depending on the value of the format flag.

Alternatively, the fields of one SCI format may comprise a subset of some or all of the fields of another SCI format. For example, the SCI corresponding to the format flag with value 0 may be scheduled for broadcast communication. A UE may ignore or discard an SCI received with a format flag with value 1. Another UE may be able to understand SCI with format flag with value 0 or value 1. When a SCI format has a format flag, the value of the format flag can determine how to interpret the bits or fields of a message. If the value of the format flag is 1, the fields of the SCI could comprise some or all of the fields of the SCI with a format flag of 0. Some new fields may be present, or some fields from the SCI with format flag 0 may be renamed or have a new meaning if the format flag is 1. The size of format 0-ext would have to be the larger one of the information needed to be contained in format 0 and format 1. Fields of extra information bits may need to be added to one or more of the formats so that the total size is the same for all formats.

Alternatively, a format flag can reserve at least one information bit to be added additional SCI types in the future.

A resource allocation type indicates if the SCI carries a SCI format 0 assignment (as described above) or the format 0-ext assignment or other SCI format assignments. Alternatively, a resource allocation type is assigned to indicate which format flag is carried by the SCI message.

If the resource allocation type is set to 0, the format carries a SCI format 0, and the fields may be set as above described example. If the resource allocation type is set to 1, the format carries a SCI format 0-ext. For example SCI format 0-ext is used to transmit below information, and how many bits of the sub-frame are used for carrying the respective control information is shown as an example in the brackets:

1. Frequency hopping flag (1 bit).
2. Resource blocks assignment and hopping resource allocation $\lceil \log_2(N_{RB}^{SL}(N_{SB}^{SL}+1)/2) \rceil$ bits. This field is encoded similarly to what is done in Downlink Control Information (DCI) format 0 for resource allocation type 0 (with or without hopping) and resource allocation type-1.
3. Time resource assignment, this field indicates which subframes comprise the resource allocation. It may be encoded similarly to e.g., a T-RPT, as described in the previous section.
4. Modulation and coding scheme and redundancy version (5 bits).

Note that $N_{RB}^{SL}$ is sidelink bandwidth configuration expressed in number of resource blocks.

For example, SCI format 1 is used by the D2D UE corresponding to the destination ID to transmit feedback information to the D2D UE corresponding to the source ID.

Note that all the fields may not need to be present all the time. This can also be useful if format 1 can be transmit either when triggered by the source ID, or not triggered.

Note that some of this information may be encoded without having a specific field. For instance, the ID may be used to scramble the Cyclic Redundancy Check, CRC.

In an example, SCI format 2 is used for the scheduling of PSSCH for broadcast/multicast/unicast communication.

In an example, fields of the SCI format 2 are used to transmit the information below, such as how many bits of the sub-frame are used for carrying the respective information (shown in the brackets).

1. Frequency hopping flag (1 bit).
2. Resource block assignment and hopping resource allocation ($\lceil \log_2(N_{RB}^{SL}(N_{SB}^{SL}+1)/2) \rceil$ bits). This field is encoded similarly to what is done in DCI format 0 for resource allocation type 0 (with or without hopping) and resource allocation type-1.

3. Time resource assignment: this field indicates which subframes comprise the resource allocation. It may be encoded similarly to e.g., an T-RPT, as described in the previous section.

4. Modulation and coding scheme and redundancy version (5 bits).

Note that N is the sidelink bandwidth configuration expressed in number of resource blocks.

In encoding the SCI, a D2D UE may need to transmit more than one formats, for example, an SCI format 0, an SCI format 1, or a combination of two or more formats. For example for bi-directional, symmetric communication, a combination of two or more formats might be needed. A single, long container is defined with one or more format flags to indicate the content that is in the container. The content means the format flags and the control information details that the format are mapped to. The unused bits of the format can be appended or filled or padded in with zeroes. The length means the size of payload of the format. Thus, having a communication message of variable size is avoided. The one or more formats can also be one format which combines all resource control information needed for connections for the D2D communication link.

Alternatively, SCI formats may be distinguished by the resources that the SCI are transmitted, for example, different resource pools.

By the above described solutions, the decoding D2D UE receives the size of the format as expected. The decoding side does not need to do blind decoding when decoding the SCI message.

An example for encoding a SCI message is to assign a D2D resource allocation (DRA) type. One SCI format is corresponded to one DRA type. The DRA type is signaled by the AP, or one of the D2D UEs in the connections. The DRA type can be transmitted using Radio Resource Control (RRC) signaling. The correspondence between DRA and SCI format can be as indicated in exemplary Table 2.

TABLE 2

| DRA | SCI format |
|-----|------------|
| 0 | 0 |
| 1 | 2, no MIMO |
| 2 | 2, open-loop MIMO |
| Etc. | Etc. |

Another embodiment is provided. A device-to-device (D2D) UE includes an indicator component that indicates resource allocation information for a D2D communication link in a resource allocation message; a mapping component that maps the resource allocation message into a resource allocation format, wherein the resource allocation format comprises one or more format flags; an encoder component that differentiates one or more resource allocation messages in the resource allocation format in accordance to the one or more format flags; and a transmitter that transmits the resource allocation format in a Physical Sidelink control Channel (PSCCH) to one or more additional D2D UEs.

Figure 9:
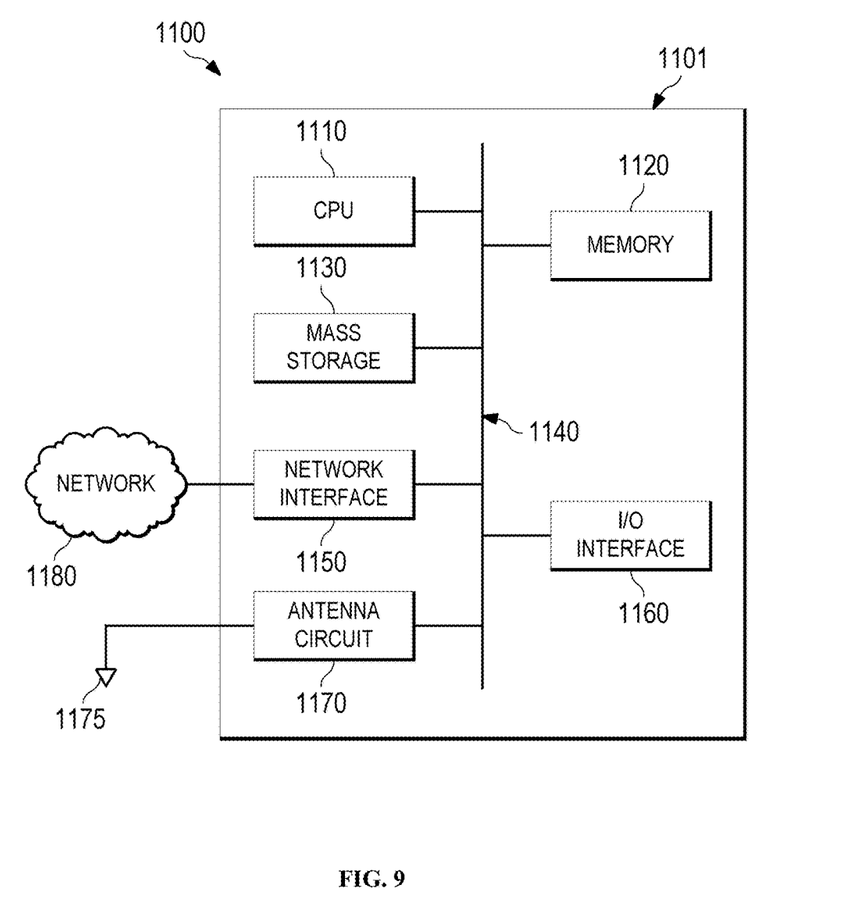
FIG. 9 shows a computing platform that may be used for implementing, for example, the devices and methods described herein, in accordance with any embodiment.

FIG. 9 shows a computing platform 1100 that may be used for implementing, for example, the devices and methods described herein, in accordance with any embodiment. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1101 in the embodiment shown comprises a processing unit equipped with one or more input/output devices, such as a speaker, microphone, mouse, touchscreen, keypad, keyboard, printer, display, and the like (not shown). The processing unit 1100 may include a central processing unit (CPU) 1110, memory 1120, a mass storage device 1130, and an I/O interface 1160, connected to a bus 1140.

The bus 1140 may be one or more of any type of several bus architectures including a memory bus or memory controller, a peripheral bus, video bus, or the like. The CPU 1110 may comprise any type of electronic data processor. The memory 1120 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs.

The mass storage 1130 may comprise any type of non-transitory storage device configured to store data, programs, and other information and to make the data, programs, and other information accessible via the bus. The mass storage 1130 may comprise, for example, one or more of a solid state drive, hard disk drive, a magnetic disk drive, an optical disk drive, or the like.

The I/O interface 1160 couples external input and output devices to the processing unit 1100. As illustrated, examples of input and output devices include a display and a mouse/keyboard/printer (not shown) coupled to the I/O interface 1160. Other devices may be coupled to the processing unit 1100, and additional or fewer interface devices may be utilized. For example, a serial interface such as Universal Serial Bus (USB) (not shown) may be used to provide an interface for a printer.

The processing unit also includes one or more network interfaces 1150, which may comprise wired links, such as an Ethernet cable or the like, and/or wireless links to access nodes or different networks 1180. The network interface 1150 allows the processing unit to communicate with remote units via the network 1180. For example, the network interface 1150 may provide wireless communication via one or more transmitters/transmit antennas 1170 and one or more receivers/receive antennas. In an embodiment, the processing unit is coupled to a local-area network or a wide-area network for data processing and communications with remote devices, such as other processing units, the Internet, remote storage facilities, or the like.

For example, a device-to-device (D2D) UE includes a memory that stores instructions and a processor coupled to the memory. When the instructions are executed by the processor, a D2D UE indicates resource allocation information for the D2D communications link, indicate resource allocation information for a D2D communication link between the D2D UE and one or more additional D2D UEs in a resource allocation message, wherein the resource allocation message is mapped into a resource allocation format; wherein the resource allocation format comprises one or more format flags; wherein one or more resource allocation messages are differentiated in the resource allocation format in accordance to the one or more format flags; and transmit the resource allocation format in a Physical Sidelink Control Channel (PSCCH) to one or more additional D2D UEs.

The following references are related to subject matter of the present application. Each of these references is incorporated herein by reference in its entirety:

3GPP TS 36.212 Specification v12.1.0 (2014-07-03).
3GPP TS 36.213 Specification v12.2.0 (2014-07-03).
3GPP TS 36.331 Specification v12.2.0 (2014-07-04).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Abbreviations are provided below:
AP Access point
BCH Broadcast CHannel
BTS Base Transceiver Station
CFI Control Format Indicator
CP Cyclic Prefix
CQI Channel Quality Control Information
CRC Cyclic Redundancy Check
CSI Channel State Information
DCI Downlink Control Information
DL-SCH Downlink Shared CHannel
DRA D2D Resource Allocation
eNB evolved NodeB
EPDCCH Enhanced Physical Downlink Control CHannel
FDD Frequency Division Duplexing
HARQ Hybrid Automatic Retransmission Request
HI HARQ Indicator
MCH Multicast CHannel
M2M Machine-to-Machine
PBCH Physical Broadcast CHannel
PCFICH Physical Control Format Indicator CHannel
PCH Paging CHannel
PDCCH Physical Downlink Control CHannel
PDSCH Physical Downlink Shared CHannel
PHICH Physical HARQ Indicator CHannel
PMCH Physical Multicast CHannel
PMI Precoding Matrix Indicator
PRACH Physical Random Access CHannel
PRB Physical Resource Blocks
ProSe Proximity Service
PSBCH Physical Sidelink Broadcast CHannel
PSCCH Physical Sidelink Control CHannel
PSDCH Physical Sidelink Discovery CHannel
PSSCH Physical Sidelink Shared CHannel
PUCCH Physical Uplink Control CHannel
PUSCH Physical Uplink Shared CHannel
RACH Random Access CHannel
RB Resource Block
RI Rank Indication
RRC Radio Resource Control
SA Scheduling Assignment
SCI Sidelink Control Information
SL-BCH Sidelink Broadcast CHannel
SL-DCH Sidelink Discovery CHannel
SL-SCH Sidelink Shared CHannel
SR Scheduling Request
SRS Sounding Reference Signal
TDD Time Division Duplexing
TPMI Transmitted Precoding Matrix Indicator
UCI Uplink Control Information
UE User Equipment
UL-SCH Uplink Shared CHannel

What is claimed is:

1. A method for communicating a resource allocation for a device-to-device (D2D) communication link in a mobile communication network, the method comprising:
identifying one or more Sidelink Control Information (SCI) message types each having a respective resource allocation format, wherein each message type comprises one or more format flags indicating the respective resource allocation format for each of the SCI message types;
determining a size of a message of at least one of the SCI message types;
receiving a first SCI message having a first type having a first respective resource allocation format and a first size;
adjusting the first size of the first SCI message to be the same size of the determined size of the message; and
transmitting the adjusted first SCI message in a Physical Sidelink Control Channel (PSCCH) to one or more UEs for establishing the D2D communication link.

2. The method of claim 1, wherein the resource allocation format comprises only one format flag, and the only one format flag is mapped to all message types needed for the communicating the resource allocation for the D2D communication link.

3. The method of claim 1, further comprising:
establishing, by a first UE, a dedicated control channel between the first UE and the one or more UEs according to resource allocation information, wherein the dedicated control channel is used for communicating only control information between the first UE and the one or more UEs.

4. The method of claim 1, wherein the one or more SCI messages are encoded according to the respective resource allocation format.

5. The method of claim 1, further comprising:
determining that a length of the size of the first SCI message is less than a predetermined length of a longest SCI message of the first type and, based thereon,
appending one or more dummy bits to the first SCI message so that the size of the first SCI message equals the length of the longest message of the first type.

6. The method of claim 5, wherein the dummy bit is zero.

7. The method of claim 1, further comprising:
transmitting, in the first SCI message, sidelink scheduling information for one destination ID of the one or more UEs.

8. The method of claim 1, wherein the resource allocation format is at least one of the following, format 0, format 1, format 2 or format 0-ext.

9. The method of claim 1, wherein an SCI message comprises resource allocation information which is at least one of the following,
scheduling of the share channel for broadcast, scheduling of the share channel for unicast, scheduling of the share channel for both broadcast and unicast, or transmitting of feedback information.

10. The method of claim 1, further comprising:
allocating at least one resource block of a sub-frame for transmitting the first SCI message to the one or more UEs, wherein the sub-frame is a sub-frame of an uplink frame.

11. A device-to-device (D2D) user equipment (UE) comprising:
a memory storing instructions; and
a processor coupled to the memory, wherein when the instructions are executed by the processor, a first UE is configured to:

identify one or more Sidelink Control Information (SCI) message types each having a respective resource allocation format, wherein each message type comprises one or more format flags indicating the respective resource allocation format for each of the SCI message types;

determine a size of a message of at least one of the SCI message types;

receive a first SCI message having a first type having a first respective resource allocation format and a first size;

adjust the first size of the first SCI message to be the same size of the determined size of the message; and transmit the adjusted first SCI message in a Physical Sidelink Control Channel (PSCCH) to one or more second UEs for establishing a D2D communication link.

12. The D2D UE of claim 11, wherein the resource allocation format comprises only one format flag, and the only one format flag is mapped to all resource allocation messages types needed for the communicating the resource allocation for the D2D communication link.

13. The D2D UE of claim 11 further configured to:

establish by the first UE, a dedicated control channel between the first UE and the one or more second UEs according to resource allocation information, wherein the dedicated control channel is used for communicating only control information between the first UE and the one or more second UEs.

14. The D2D UE of claim 13, wherein the one or more SCI messages are encoded according to the respective resource allocation format; and determining that a length of the size of the first SCI message is less than a predetermined length of a longest one of the SCI message types and, based thereon, one or more dummy bits to the first SCI message so that the size of the first SCI message equals the length of the longest one of the SCI message types.

15. The D2D UE of claim 14, wherein the dummy bit is zero.

16. The D2D UE of claim 11, wherein in the first SCI message transmits sidelink scheduling information for one destination ID of the one or more second UEs.

17. The D2D UE of claim 11, wherein the first UE is further configured to allocate at least one resource block of a sub-frame for transmitting the first SCI message to the one or more second UEs, wherein the sub-frame is a sub-frame of an uplink frame.

* * * * *